United States Patent [19]
Zawislak et al.

[11] Patent Number: 5,691,607
[45] Date of Patent: Nov. 25, 1997

[54] MODULAR HIGH POWER MODULATOR

[75] Inventors: Robert Matthew Zawislak, Palatine; Kenneth John King, Algonquin; John Michael Rein, Elgin; Jeffrey Coe Perkins, Island Lake, all of Ill.

[73] Assignee: Northrop Grumman Corporation, Los Angeles, Calif.

[21] Appl. No.: 638,458

[22] Filed: Apr. 26, 1996

[51] Int. Cl.⁶ ........................................................ G05F 1/00
[52] U.S. Cl. ...................... 315/308; 315/209 R; 315/224; 315/277; 363/17; 363/41
[58] Field of Search ........................ 315/209 R, 216, 315/223, 224, 246, 287, 277, 308; 363/16, 17, 26, 37, 41

[56] References Cited

U.S. PATENT DOCUMENTS

| | | | |
|---|---|---|---|
| 3,567,969 | 3/1971 | Goode et al. | 307/253 |
| 4,114,071 | 9/1978 | Thrower, Jr. et al. | 315/226 |
| 4,160,214 | 7/1979 | Colin et al. | 328/65 |
| 4,204,587 | 5/1980 | Mortimer et al. | 315/308 |
| 4,243,261 | 1/1981 | Bergervoet et al. | 315/248 |
| 4,309,639 | 1/1982 | Thrower, Jr. et al. | 315/82 |
| 4,319,316 | 3/1982 | Farrer et al. | 363/41 |
| 4,359,669 | 11/1982 | Anderson | 315/208 |
| 4,415,839 | 11/1983 | Lesea | 315/308 |
| 4,464,606 | 8/1984 | Kane | 315/158 |
| 4,692,851 | 9/1987 | Attwood | 363/16 |
| 4,783,728 | 11/1988 | Hoffman | 363/37 |
| 4,904,905 | 2/1990 | Olon | 315/244 |
| 5,140,602 | 8/1992 | O'Loughlin | 372/38 |
| 5,365,151 | 11/1994 | Spiegel et al. | 315/209 R |

*Primary Examiner*—Robert Pascal
*Assistant Examiner*—Haissa Philogene
*Attorney, Agent, or Firm*—Terry J. Anderson; Karl J. Hoch, Jr.

[57] ABSTRACT

A single-stage modular modulator for pulsed illumination sources uses a full-range converter which converts unregulated DC to a 40–50 kHz carrier modulated at a frequency of a few hundred to a few thousand hertz. The modulated carrier is applied to the illumination source through a step-down transformer followed by a low-pass filter circuit which removes the carrier. The converter is controlled by a modulation control which uses an instantaneous load current signal feedback to follow a modulation commend signal, and a current mode signal representing the primary current of the transformer to compensate for converter output variations caused by input voltage variations.

10 Claims, 3 Drawing Sheets

MODULAR HIGH POWER MODULATOR

FIELD OF THE INVENTION

The invention relates generally to modulators for arc lamps or lasers, and more particularly to high-power modular modulators for switching very high currents at frequencies reaching into the kilohertz range.

BACKGROUND OF THE INVENTION

High-power modulators for arc lamps or lasers are well known. They are used, for example, in electro-optical infrared (EO/IR) systems such as target illumination systems, which are conventionally designed to emit high intensity pulses of infrared light at frequencies ranging from hundreds to thousands of hertz. The emitters for these light pulses may typically be arc lamps or solid state lasers. Due to the nature of their use, these systems are frequently installed on aircraft or spacecraft, where weight and size, as well as cost, of the EO/IR equipment are important limitations.

Conventionally, EO/IR systems are powered by power converters using a dual conversion process in which the prime AC power is first converted to a regulated DC output with a large energy storage capacitor bank. This capacitor bank then provides power to a buck type switch mode current-regulated modulator stage. The simmer current for the arc lamp is supplied by a separate parallel-connected current source.

Although such two-stage modulators have proven generally suitable for their intended purposes, they possess inherent deficiencies which detract from their overall effectiveness and desirability, particularly in airborne applications. Specifically, the conventional approach has two drawbacks: for one, the two-stage processing requires two sets of heavy, expensive high-current components, and for another, it does not lend itself to being easily adapted to efficiently handle the varying current requirements of different light sources.

In view of the shortcomings of the prior art, it is desirable to provide a simpler, smaller, lighter and less costly modulator for EO/IR systems. As such, although the prior art has recognized to some extent the need for increased efficiency of modulators, the proposed solutions have, to date, been ineffective in providing a satisfactory remedy.

SUMMARY OF THE INVENTION

The present invention specifically addresses and alleviates the above-mentioned deficiencies associated with the prior art. More particularly, the present invention comprises a modulator having a single-stage power processing circuit whose switch mode circuitry is operated under current mode control to compensate for deviations in input supply voltage so as to obviate the need for DC voltage regulation.

In a first embodiment, the modulator of this invention comprises a rectifier which converts the prime AC power to an unregulated DC voltage. This voltage is applied to a full-bridge quasi-resonant forward converter operating at a frequency equal to or greater than twice the maximum modulating frequency. The exact operating frequency for a specific application is chosen to meet efficiency and performance requirements in accordance with conventional engineering practice, as well as to satisfy practical design limitations.

The output of the forward converter is applied to a pair of series-connected transformers which perform the functions of voltage step-down, isolation, and AC current regulation. The output of one of the transformers is applied to the modulator control circuitry as the current mode control input, while the output of the other is applied to a low pass filter which removes the unwanted carrier frequency from the modulator's pulse waveform. The thus filtered transformer output drives the load, e.g. an arc lamp. A current sense resistor in the load-driving transformer's secondary tap generates an instantaneous load current signal which is compared to the modulation command signal and simmer level in the control circuitry for the purpose of regulating the instantaneous load current.

In another embodiment, the invention comprises an interconnection of several modulator modules to provide a convenient and inexpensive way of driving loads requiring higher peak modulation currents than the approximately 70 A per module which can be delivered by the use of insulated gate bipolar devices in the full bridge modulator.

These, as well as other advantages of the present invention will be more apparent from the following description and drawings. It is understood that changes in the specific structure shown and described may be made within the scope of the claims without departing from the spirit of the invention.

DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
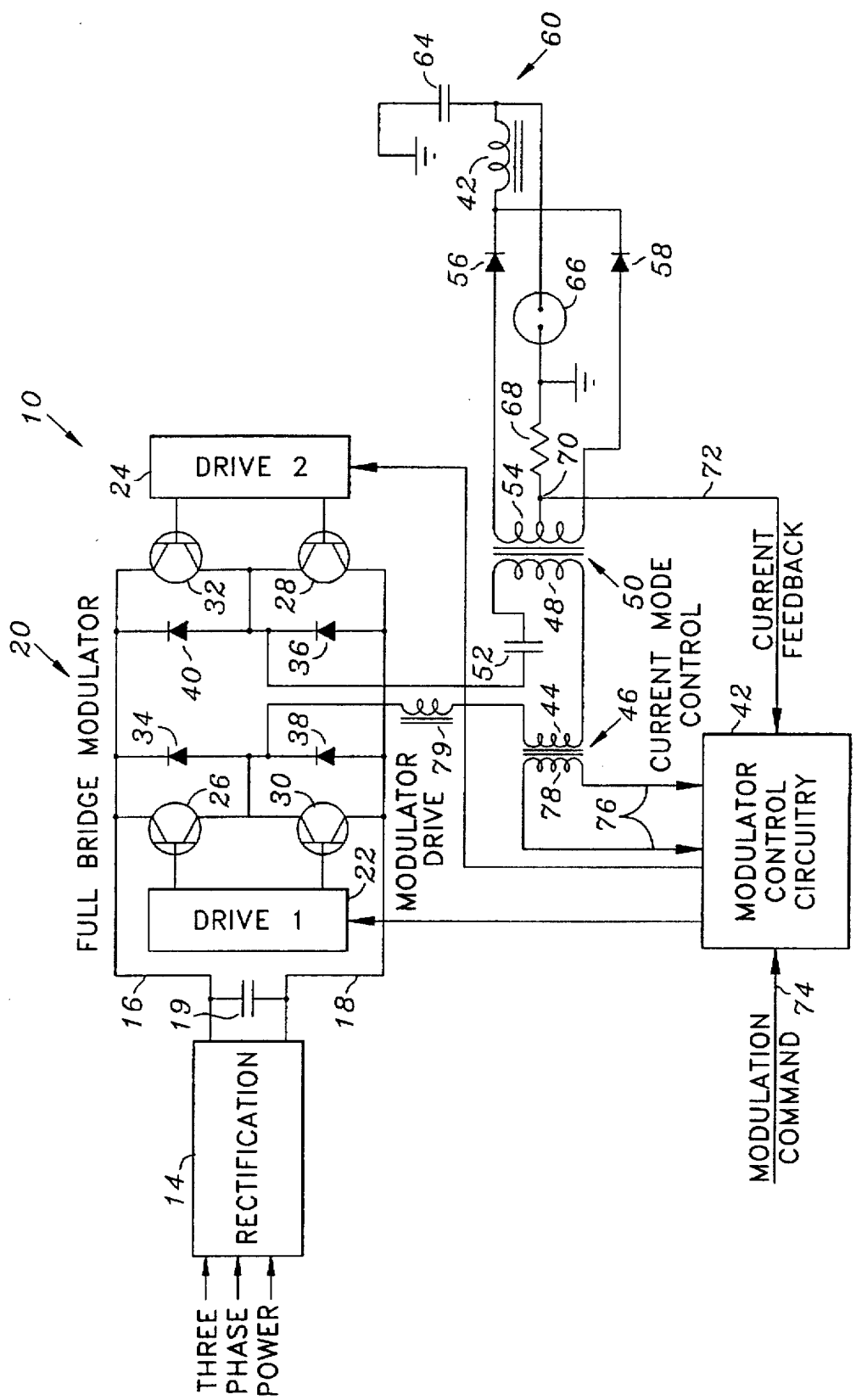
FIG. 1 is a circuit diagram, partly in block form, of one embodiment of the invention.

FIG. 1 shows the modulator 10 of this invention in block form. Three-phase AC power is applied at 12 to a conventional rectifier 14 whose output is an unregulated DC voltage of, e.g. about 270 V appearing across lines 16, 18. Any AC component remaining in the output of rectifier 14 is eliminated by bypass capacitor 19.

The DC voltage is converted into square wave AC at an appropriate operating frequency, about 40 kHz for example, by the full bridge converter 20 consisting of gate drives 22, 24; transistors 26, 28, 30, 32; and diodes 34, 36, 38, 40. The drives 22, 24 serve as both drives and isolators to the transistors 26, 28, 30, 32 which, at a 40 kHz operating frequency, are preferably insulated gate bipolar devices to provide high current capacity, but may be other types of devices at higher switching frequencies (e.g. >100 kHz). The drives 22, 24 are operated by the modulator control circuitry 42 in a manner described below to alternate between two states at the 40 kHz carrier frequency. The duration of these two states is modulated as described below at a modulation frequency ranging from a few hundred to a few thousand hertz. In the interval between the two states, both drives 22, 24 are off.

In the first state, drive 22 switches transistor 26 on and transistor 30 off while drive 24 switches transistor 28 on and transistor 32 off. In this state, current flows first through resonant components 52 and 79, through primary winding 44 of transformer 46, and then through primary winding 48 of transformer 50. Capacitor 52 along with inductor 79 and the leakage inductance of transformer 50 are resonant at the switching frequency. At turn-off of the transistors 26, 28, stored energy in inductor 79 transitions the inverter voltage and current flows in 32 and 38.

In the second state, drive 22 switches transistor 30 on and transistor 26 off while drive 24 switches transistor 32 on and transistor 28 off. The resulting 40 kHz variable duty cycle truncated sine wave current in primary winding 48 of transformer 50 produces a 40 kHz output in the secondary winding 54 of transformer 50. This output is rectified by diodes 56, 58, and the 40 kHz carrier is removed by a low-pass filter 60 consisting of inductance 62 and capacitor 64. The resulting DC voltage is applied to the load (e.g. arc lamp) 66.

Current sensing resistor 68 provides at junction 70 a current feedback signal 72 which is used by the modulator control circuitry 42 in a manner described below to modulate the arc lamp current in accordance with the modulation command 74.

The primary current of transformer 50 is monitored by transformer 46, whose primary current is identical to the primary current of transformer 50. The output 76 of secondary winding 78 of transformer 46 is therefore representative of the AC current put out by the bridge modulator 20, and can be used, through the modulator control circuitry 42, to vary the duty cycle of the transistors 26, 28, 30, 32 to compensate for input voltage variations.

Figure 3:
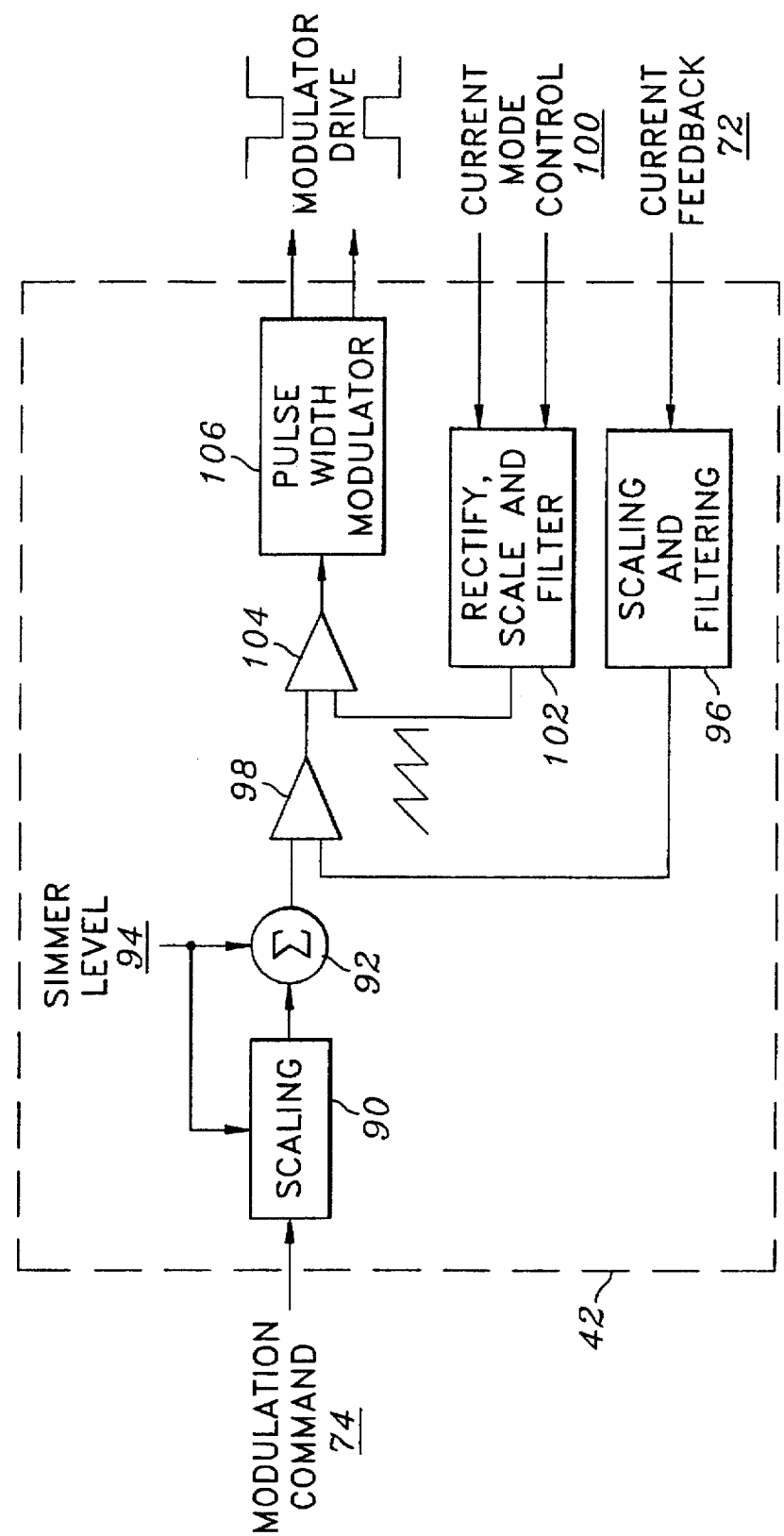
FIG. 3 is a block diagram of the modulator control circuitry.

The control circuit 42 is shown in more detail in FIG. 3. The modulation command 74 which is a waveform representing the operator-dictated modulation of the light intensity (i.e. the current through arc lamp 66), is scaled at 90 and added at 92 to a simmer level signal 94 which represents the minimum current at which the arc can be maintained. The output of the adder 92 and the current feedback signal 72, scaled and filtered at 96, constitute the inputs to amplifier 98 whose output represents the instantaneous difference between the desired arc lamp current level and the actual arc lamp current level.

The current mode control signal 100 from transformer 46 is integrated at 102 to produce a 40 KHz sawtooth wave which is applied, together with the output of amplifier 98, to comparator 104. The output of comparator 104 triggers the pulse width modulator 106 which actuates the modulation drivers 22, 24. The current mode control effected by the signal 100 is an inner feed-forward loop which regulates the primary current of transformer 50 to compensate for the deviations of input voltage that can be expected from the unregulated DC voltage produced by rectifier 14.

Figure 2:
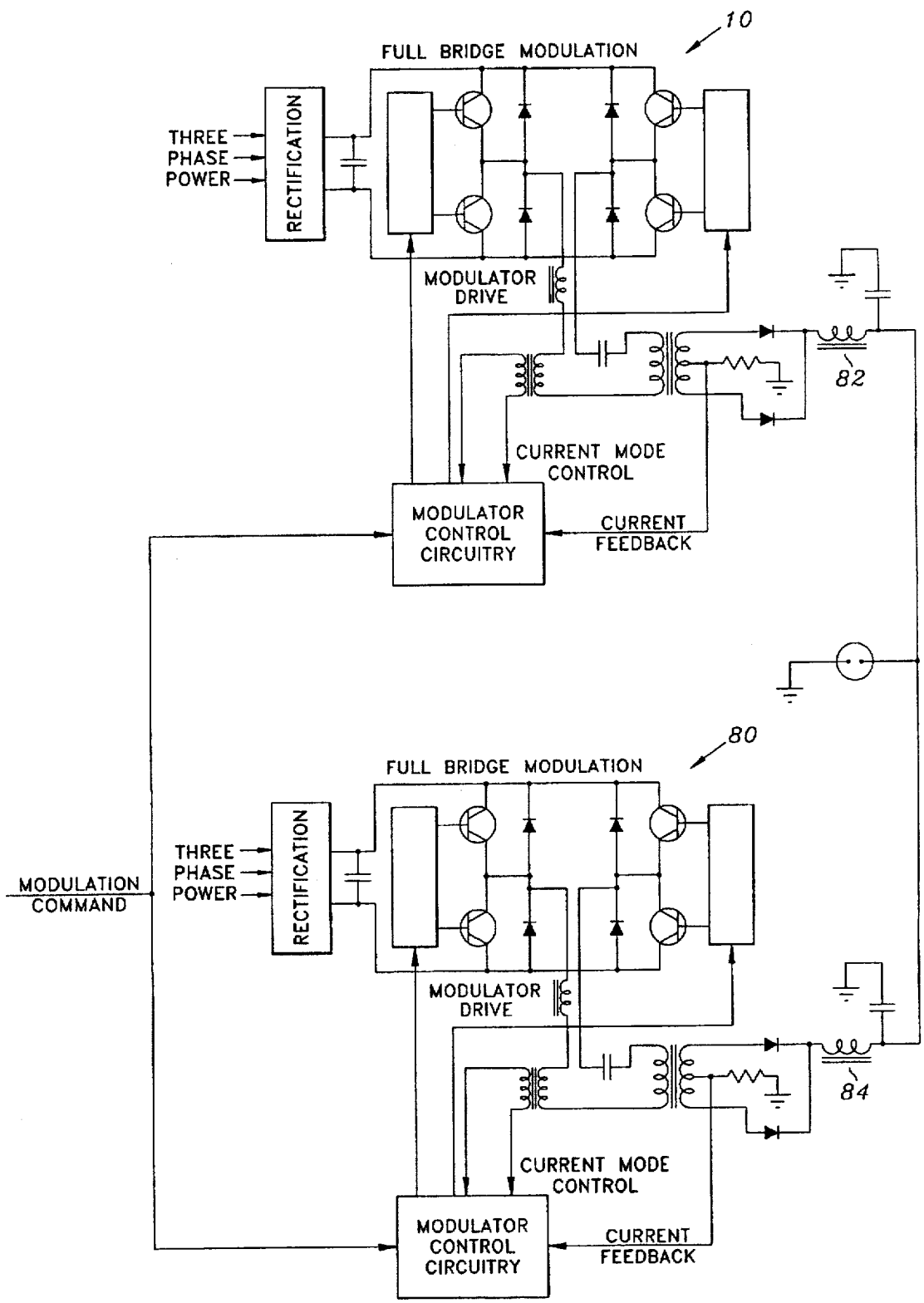
FIG. 2 is a circuit diagram, partly in block form, of another embodiment of the invention.

In order to drive loads that exceed the current capacity of the module 10, it is possible to parallel as many modules 10 as may be required to deliver the needed current to the load 66. Such a parallel connection is shown in FIG. 2. All of the elements of modulator 10 and modulator 20 work in the same way as described above in connection with modulator 10; however, the low pass filter outputs 82, 84 of modulators 10 and 80 are connected together and provide the input to the load 66.

It is understood that the exemplary modular circuitry described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A modulator for pulsed illumination sources, comprising:
  a) a source of AC power;
  b) a rectifier for converting said AC power to unregulated DC power;
  c) a full-bridge converter arranged to receive said DC power and to convert it to substantially square-wave AC power at a carrier frequency, the duty cycle of said square wave being variable at a lower modulation frequency under current control;
  d) a load;
  e) a transformer connected between said converter and said load;
  f) a low-pass filter connected between said transformer and said load for removing said carrier-frequency AC from the output of said transformer;
  g) a modulation control circuit connected to said converter and having a modulation command input;
  h) a monitoring element arranged to provide to said modulation control circuit a signal indicative of the primary current of said transformer; and
  i) a current sensing element arranged to provide to said modulation control circuit a signal indicative of the instantaneous current through said load;
  j) said modulation control circuit being arranged to vary said modulation frequency in accordance with said modulation command input, said primary current signal, and said instantaneous current signal.

2. The modulator of claim 1, in which said instantaneous load current sensing element is a current sensing resistor.

3. The modulator of claim 1, in which said converter includes insulated gate bipolar transistors.

4. A modulator for pulsed illumination sources, comprising:
  a) a source of AC power;
  b) a rectifier for converting said AC power to unregulated DC power;
  c) a full-bridge converter arranged to receive said DC power and to convert it to substantially square-wave AC power at a carrier frequency, the duty cycle of said square wave being variable at a lower modulation frequency Under current control;
  d) a load;
  e) a transformer connected between said converter and said load;
  f) a low-pass filter connected between said transformer and said load for removing said carrier-frequency AC from the output of said transformer;
  g) a modulation control circuit connected to said converter and having a modulation command input;
  h) a monitoring element arranged to provide to said modulation control circuit a signal indicative of the primary current of said transformer; and
  i) a current sensing element arranged to provide to said modulation control circuit a signal indicative of the instantaneous current through said load;
  j) said modulation control circuit being arranged to vary said modulation frequency in accordance with said modulation command input, said primary current signal, and said instantaneous current signal; and k) said primary current monitoring element being a second transformer having its primary winding connected in series with the primary winding of said first-named transformer, the output of the secondary winding of said second transformer being said signal indicative of said primary current of said first-named transformer.

5. A modulator for pulsed arc lamps, comprising:

a) a source of AC power;

b) a rectifier for converting said AC power to unregulated DC power;

c) a full-bridge converter arranged to receive said DC power and to convert it to substantially square-wave AC power at a carrier frequency, the duty cycle of said square wave being variable at a lower modulation frequency under current control;

d) an arc lamp;

e) a transformer connected between said converter and said load;

f) a low-pass filter connected between said transformer and said load for removing said carrier-frequency AC from the output of said transformer;

g) a modulation control circuit connected to said converter for switching said converter, said modulation control including:
   i) a source of modulation commands;
   ii) a simmer level reference representing a minimum current level for said arc lamp;
   iii) an adder for said modulation commands and reference;
   iv) a source of current signals indicative of the actual instantaneous current drawn by said arc lamp;
   v) a first comparator connected to produce an output representative of the difference between the instantaneous current commanded by said combined modulation command and said actual instantaneous current;
   vi) a source of current mode control signals representative of the current drawn by said transformer;
   vii) a second comparator connected to produce a pulse width output signal representative of said difference output modified as a function of said current mode control signals; and
   viii) a pulse width modulator responsive to said pulse width output signal and connected to cause said converter to be switched in accordance with said pulse width output signal.

6. A modulation system for arc lamps or the like, comprising:

a) a source of unregulated DC power;

b) an output transformer having first and second windings;

c) a converter connected to said unregulated DC source and arranged to alternately supply pulses of opposite polarity to said first winding at a predetermined frequency;

d) drive circuitry arranged to vary the width of said pulses in response to a modulation signal;

e) an output circuit connected to said second winding and to a load, and arranged to produce a DC load current varying in accordance with said pulse width and with the level of said unregulated DC power;

f) a current sensor in said output circuit arranged to produce a current feedback signal representative of said load current; and g) a modulator arranged to produce said modulation signal, said modulator including:
   i) a first input receiving a current mode signal representative of the current flowing in said first winding;
   ii) a second input receiving said current feedback signal; and
   iii) a third input receiving a modulation command signal representative of the desired load current;
   iv) said modulation combining said current mode, current feedback and signals modulation command to produce said modulation signal.

7. The system of claim 6, in which said current mode signal is generated by a transformer having a primary winding connected in series with said first winding.

8. The system of claim 6, in which the circuitry of said converter which supplies pulses to said first winding is resonant at said predetermined frequency.

9. The system of claim 6, in which said current mode signal produces a sawtooth wave at said predetermined frequency whose peak amplitude varies with said level of said unregulated DC power, said modulation command signal produces a first comparison signal, said current feedback signal produces a second comparison signal, said first and second comparison signals are compared to produce an error signal, and said pulse width is the time during which said error signal exceeds the amplitude of said sawtooth wave.

10. The system of claim 9, further comprising a source of a predetermined voltage which is added to said modulation command signal prior to said comparison to maintain said load current above a predetermined minimum.

* * * * *